United States Patent
Gregson

(10) Patent No.: US 7,072,305 B1
(45) Date of Patent: Jul. 4, 2006

(54) METHOD AND APPARATUS FOR ANALYZING A COMMUNICATIONS NETWORK LINK

(75) Inventor: J. Michael Gregson, San Diego, CA (US)

(73) Assignee: Applied Digital Access, Inc., San Diego, CA (US)

( * ) Notice: Subject to any disclaimer, the term of this patent is extended or adjusted under 35 U.S.C. 154(b) by 0 days.

(21) Appl. No.: 09/430,687

(22) Filed: Oct. 29, 1999

(51) Int. Cl.
*H04J 1/16* (2006.01)
*H04J 3/14* (2006.01)

(52) U.S. Cl. .................... 370/241; 370/242; 370/248

(58) Field of Classification Search ........ 370/241–245, 370/252, 253, 248, 249; 379/102.01, 102.02, 379/102.03; 714/25, 47, 712, 715, 716, 717, 714/821

See application file for complete search history.

(56) References Cited

U.S. PATENT DOCUMENTS

| | | | | |
|---|---|---|---|---|
| 5,375,159 A | * | 12/1994 | Williams | 379/23 |
| 5,600,632 A | * | 2/1997 | Schulman | 370/252 |
| 5,691,976 A | * | 11/1997 | Engdahl et al. | 370/242 |
| 5,706,333 A | | 1/1998 | Grenning et al. | |
| 5,930,707 A | | 7/1999 | Vambaris et al. | |
| 6,091,712 A | * | 7/2000 | Pope et al. | 370/244 |
| 6,091,950 A | * | 7/2000 | Remy | 455/423 |
| 6,169,724 B1 | * | 1/2001 | Begum et al. | 370/216 |
| 6,230,006 B1 | * | 5/2001 | Keenan et al. | 455/424 |
| 6,343,064 B1 | * | 1/2002 | Jabbarnezhad | 370/216 |
| 6,769,024 B1 | * | 7/2004 | Natarajan et al. | 709/224 |

* cited by examiner

*Primary Examiner*—Ajit Patel
(74) *Attorney, Agent, or Firm*—Allen, Dyer, Doppelt, Milbrath & Gilchrist, P.A.

(57) ABSTRACT

A method and system for testing at least one link in a communications network. The system includes first and second analyzer units that are configured to test an existing link in the network. Alternatively, the first and second analyzer units may be configured to establish and test a link between them. A computer remotely controls the first and second analyzer units to perform testing of various communication parameters, such as packet loss and latency. Each analyzer unit may be configured to collect data over a predetermined duration to establish a network baseline of operation, which may be used to detect future network malfunctions. The computer estimates the deviation of communication parameters from the network baseline.

24 Claims, 5 Drawing Sheets

METHOD AND APPARATUS FOR ANALYZING A COMMUNICATIONS NETWORK LINK

BACKGROUND OF THE INVENTION

1. Field of the Invention

The invention relates generally to the monitoring and testing of links in a communications network, such as a telephone network. More particularly, this invention relates to monitoring and testing a link between two or more locations in the telephone network.

2. Description of the Related Technology

Communication of data in a communications network often involves compliance with several transmission standards, such as frame relay, asynchronous transfer mode (ATM), integrated services digital network (ISDN), fiber distributed data interface (FDDI), and the Internet. These standards specify a variety of signal protocols and require conversion of signals from one protocol to another, and vice versa. Generally, a protocol refers to an agreed-upon format for transmitting data between two devices. The protocol determines, among other things, the type of error checking to be used, method of data compression, if any, and how a device indicates that it has finished sending or receiving a message. Several of the most significant protocols in use today are frame relay, ATM, ISDN, FDDI, and TCP/IP.

Frame relay is a packet-switching protocol for connecting devices on a wide area network (WAN). Frame relay networks support data transfer rates at 1.544 Megabits per second (Mbps) (also known as DS1 or T1 rate) and 44.736 Mbps (also known as DS3 or T3 rate). ATM is a packet-based network supporting data transfers between 25 and 622 Mbps. ATM offers a fixed point-to-point connection known as a "virtual circuit" (VC) between a source and destination. ATM is often transmitted over a physical medium known as a synchronous optical network (SONET) which employs fiber optic links. SONET defines a fiber optic transmission system offering optical channels from optical carrier 1 (OC-1) at 51 Mbps to OC-96 at 4.8 Gigabits per second (Gbps).

ISDN is an international communications standard for sending voice, data, and video over digital telephone lines. ISDN requires special metal wires and supports data transfer rates of 64 kilobits per second (kbps). FDDI is a set of American National Standards Institute (ANSI) protocols for sending digital data over fiber optic cable. FDDI networks support data rates up to 100 Mbps. FDDI networks are typically used as backbones for WANs. Finally, data traffic on the largest public network in the world, the Internet, conforms to Transmission Control Protocol/Internet Protocol (TCP/IP) standard which is a suite of communication protocols for connecting host computers on the Internet.

An open systems interconnection (OSI) model is often implemented to facilitate the interoperability of systems conforming to different standards. The OSI model provides a widely accepted structuring technique called "layering" whereby the communications functions are partitioned into a hierarchical set of layers. Each layer performs a related subset of the functions required to communicate with another system. Ideally, the layers are defined so that changes in one layer do not require changes in other layers. The OSI model defines the following: physical, data link, network, transport, session, presentation, and application layers. The following is a brief description of the function and purpose of each layer.

The physical layer defines the transmission of unstructured bit streams over physical links, involving parameters such as voltage swings and bit duration. The data link provides reliability to the bit stream by defining error detection and control bits. The network layer is responsible for establishing, maintaining, and terminating connections across one or more networks between two communicating systems. The transport layer is responsible for maintaining proper sequence and error-free delivery of data between two communicating systems. The session layer controls the dialogue between two communicating systems by specifying discipline (e.g., half- or full-duplex), grouping of data, and checkpoint mechanism for recovering lost data. The presentation layer defines data formats exchanged between applications by offering a set of transformation services, such as compression or encryption. Finally, the application layer defines the mechanism of accessing the OSI environment to support the exchange of information between two or more applications, such as file transfer and electronic mail.

As the number of communications networks increases, so does the complexity of managing, maintaining, and troubleshooting a malfunction in these networks. Service providers (e.g., telephone companies) may deploy one or more devices across the network to collect data from the network to analyze data protocol. For further details on such data collection, reference is made to a co-pending application entitled "SYSTEM AND METHOD OF ANALYZING NETWORK PROTOCOLS", application Ser. No. 09/188,923 and filed on Nov. 9, 1998, (the '923 application) which is incorporated in its entirety by reference.

For these devices to collect data from the network, the network is expected to be operational. More particularly, it is expected that the network be active with data flowing through the collection point. If the network is down with no data flowing through the collection point, service providers have to dispatch technicians to the field to test the network at various points. Frequent dispatch of technicians increases maintenance cost and downtime, thereby raising cost of service to consumers. During this process, actual examination of a link at multiple locations may be necessary to isolate the source of the malfunction in the network. Moreover, the network user's operation is shut down or, in some cases, transferred to more costly back-up solutions.

Therefore, there is a need in communications network technology to provide service providers with the ability to maintain and troubleshoot their network in an efficient and cost-effective manner.

SUMMARY OF THE INVENTION

The invention provides a system for testing at least one link in a communications network. In one embodiment, the system comprises a first analyzer unit that is in data communication with the network, and a second analyzer unit that is in data communication with the first analyzer unit. The system further comprises a computer that is in data communication with the first and second analyzer units. The computer is configured to command the first analyzer unit to establish a network link with the second analyzer unit. The first analyzer unit collects diagnostic data from the network link and communicates the data to the computer. In another embodiment, the system comprises first means for analyzing the link, wherein the first analyzing means is in data communication with the network. The system further comprises second means that is in data communication with the first analyzing means. The system further comprises means for controlling the first and second analyzing means. The controlling means is configured to command the first analyzing means to establish a network link with the second analyzing means. The first analyzing means collects diagnostic data from the network link and communicates the data to the controlling means.

In another embodiment, the invention provides a method of testing at least one link in a communications network. The method comprises establishing a link between a first analyzer unit and a second analyzer unit that are connected to the network. The method further comprises measuring at least one communication parameter of the link, and determining whether the communication parameter deviates from a network baseline by a predetermined threshold. The method further comprises issuing an alert in the event that the communication parameter deviates from the network baseline by the predetermined threshold.

BRIEF DESCRIPTION OF THE DRAWINGS

Certain aspects, features and advantages of certain embodiments of the invention will be better understood by referring to the following detailed description, which should be read in conjunction with the accompanying drawings, in which.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
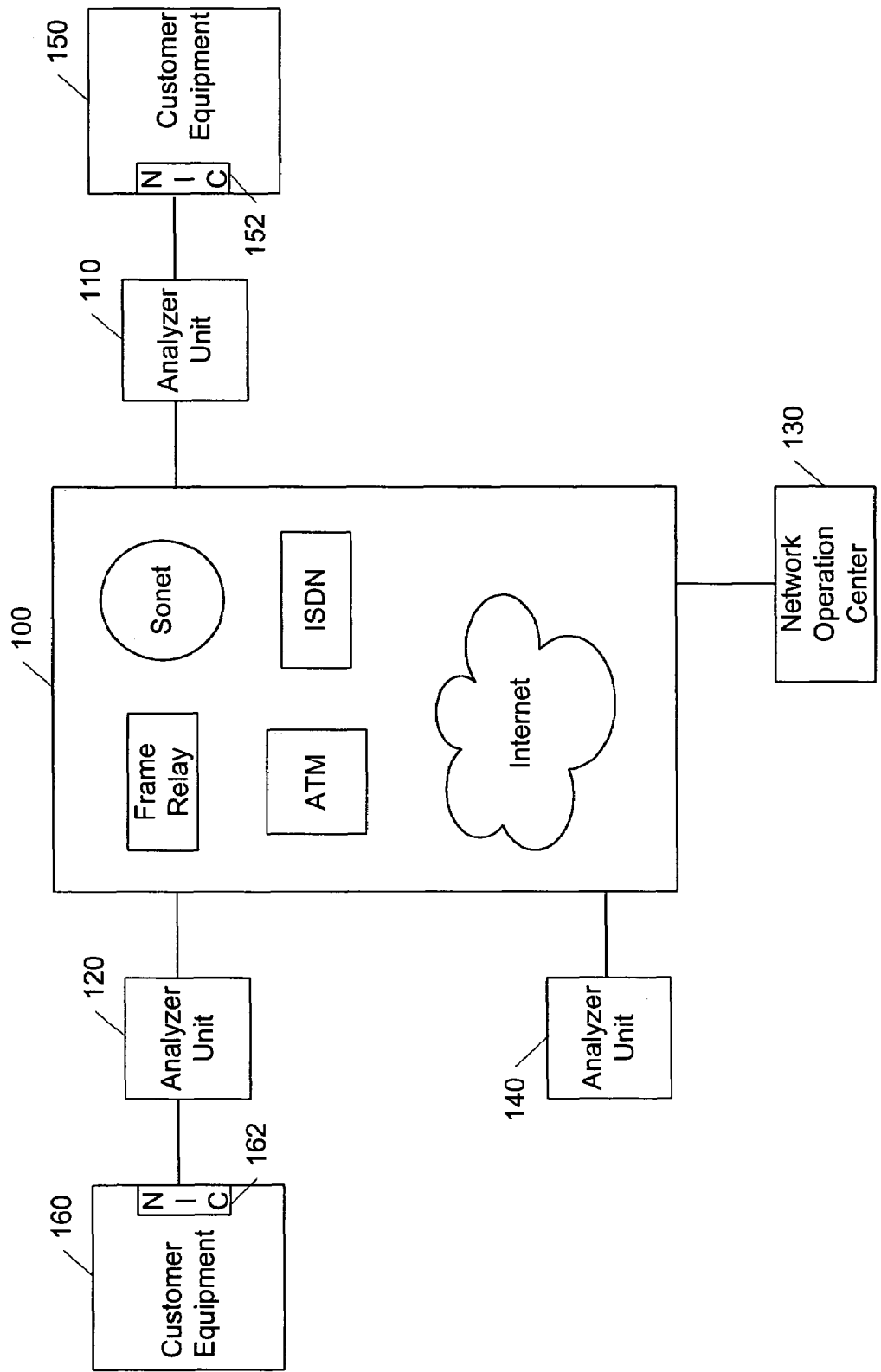
FIG. 1 is a block diagram of one embodiment of one or more analyzer units integrated into a communications network.

FIG. 1 is a block diagram of an exemplary communications network 100 operated by one or more service providers. The network 100 typically comprises a suite of communication equipment that are commonly used in communications networks. The kind of equipment which a communications network include depends on the communication standards that the network supports. For example, the network 100 may include frame relay and telephone switches (e.g., for DS0, DS1, DS3, and T1), ATM equipment, SONET equipment (e.g., for OC-1 through OC-96), server computers (e.g., for TCP/IP), and/or wireless transceivers. The communications equipment may communicate voice and data among multiple locations across the network 100 via landlines, such as copper or fiber optic cables, and/or wireless links.

A service provider typically includes local and long distance telephone companies, which provide communication services to multiple customers, such as the customer equipment 160 and 150. Typically, a customer connects to the network via one or more network interface cards (NIC) that is compatible with the signal standards and protocols specified by the network 100. For example, the customer equipment 150 and 160 may interface to the network 100 using the NIC 152 and 162, respectively. The customer may communicate a variety of information in accordance with its subscribed quality of service (QoS), which specifies several communication criteria including bandwidth and data rate. In this embodiment, the service provider may manage the performance of its portion of the network from one or more network operation centers (NOC), such as the NOC 130. The basic features of the NOC 130 are similar to the features of the network embedded protocol access (NEPA) system, described in the '923 application. For example, the NOC 130 may include a web-based server computer that collects diagnostic information from one or more access devices. The server computer of the NOC 130 may be configured to function as a remote computer that controls the operation of the access devices.

In one embodiment, the invention provides one or more access devices such as the analyzer units 110, 120, and 140 that are located at preselected locations across the network. There may be several analyzer units distributed across the network 100, and only three exemplary analyzer units are shown in FIG. 1. Each analyzer unit allows the service provider administrator, or any party authorized on its behalf, to access, monitor and analyze the performance of its portion of the network remotely, e.g., via the Internet. It is desirable to place the analyzer unit at network boundaries to analyze the performance of the network at its boundary points. The term network boundary generally refers to a location in the network beyond which the service provider no longer maintains control of the equipment, e.g., the customer equipment 150. Accordingly, as shown in FIG. 1, the analyzer units 110, 120, and 140 are placed at the network boundary. As explained below, accessing the network 100 at its boundary allows greater accuracy and versatility in troubleshooting the network 100 by isolating customer equipment from the network 100.

Each analyzer unit is configured to perform protocol and physical layer analysis for network links, such as voice frequency (VF), digital data system (DDS), and high capacity digital services (HCDS) circuits. The protocol analysis of the network link indicates the level of performance of the network by providing a variety of information including bit error rate (BER) and packet latency. BER represents the fraction of the number of bits received incorrectly over the total number of bits transmitted from a source to a destination. Typically, BER rate is expressed as a percentage or, more commonly, as a ratio. In network communications, BER may be represented by cell or packet loss, where the cell or packet is a set of data. The term latency generally refers to the amount of time a packet takes to travel between a source and a destination across the network 100. As explained in greater detail below, the combination of the packet loss and latency provide the network administrator with a proper characterization of the network performance.

In one embodiment, a central station, such as the NOC 130, remotely controls the analyzer units 110, 120, and 140 via the network 100, which may include an ATM, Frame Relay, ISDN, SONET, and Internet, or a dedicated link such as direct dial-up. The network administrator may configure the NOC 130 and analyzer units to communicate via any of the links available in the network 100. Additionally, at the option of the network administrator, the NOC 130 may remotely control the analyzer units via a facilities data link (FDL) which allows communication over a predetermined physical path between the NOC 130 and analyzer units. The FDL link is quite useful in the event that other links of the network are down.

In this embodiment, the NOC 130 transmits control signals to instruct the one or more of the analyzer units 110, 120, and 130 to collect diagnostic data from its respective location for analysis, as noted above. Additionally, each analyzer unit may be configured to establish a network link with another analyzer unit upon demand. For example, the NOC 130 may instruct the analyzer unit 110 to establish a link and communicate test data with the analyzer unit 120. The test data may comprise a predetermined set of data streams that makes it possible for the participating analyzer unit to determine packet loss and latency between their respective locations at the network boundary.

The ability to establish a link between two or more analyzer units allows the network administrator to troubleshoot and maintain the network even when no operational links exist (i.e, when the link is down) in the network 100. This advantage is possible with the ability of each analyzer unit to independently generate its own data streams and, hence, avoid relying merely on the data traffic flowing in the network 100. Thus, the analyzer units may be configured to simulate communication links in the network 100 to test the physical and protocol layers of circuits in the network 100. One commercial embodiment of the analyzer unit may be the Probe Sentry, manufactured by Applied Digital Access (ADA).

In one embodiment, it is desirable to establish a baseline for acceptable performance of the network 100. The baseline represents one or more operational criteria that characterize the performance of the network 100. For example, the baseline may be expressed by a threshold level of packet loss and/or latency at a particular location in the network 100 as a function of time. A packet loss or latency that exceeds the threshold level by a predetermined percentage or ratio (e.g., 5%, 10%, 20%, or any other percentage desired by the network administrator) may trigger an alert of a potential or actual problem at the location in the network 100. The process of troubleshooting the network 100 based on the baseline is described in greater detail below.

Figure 2:
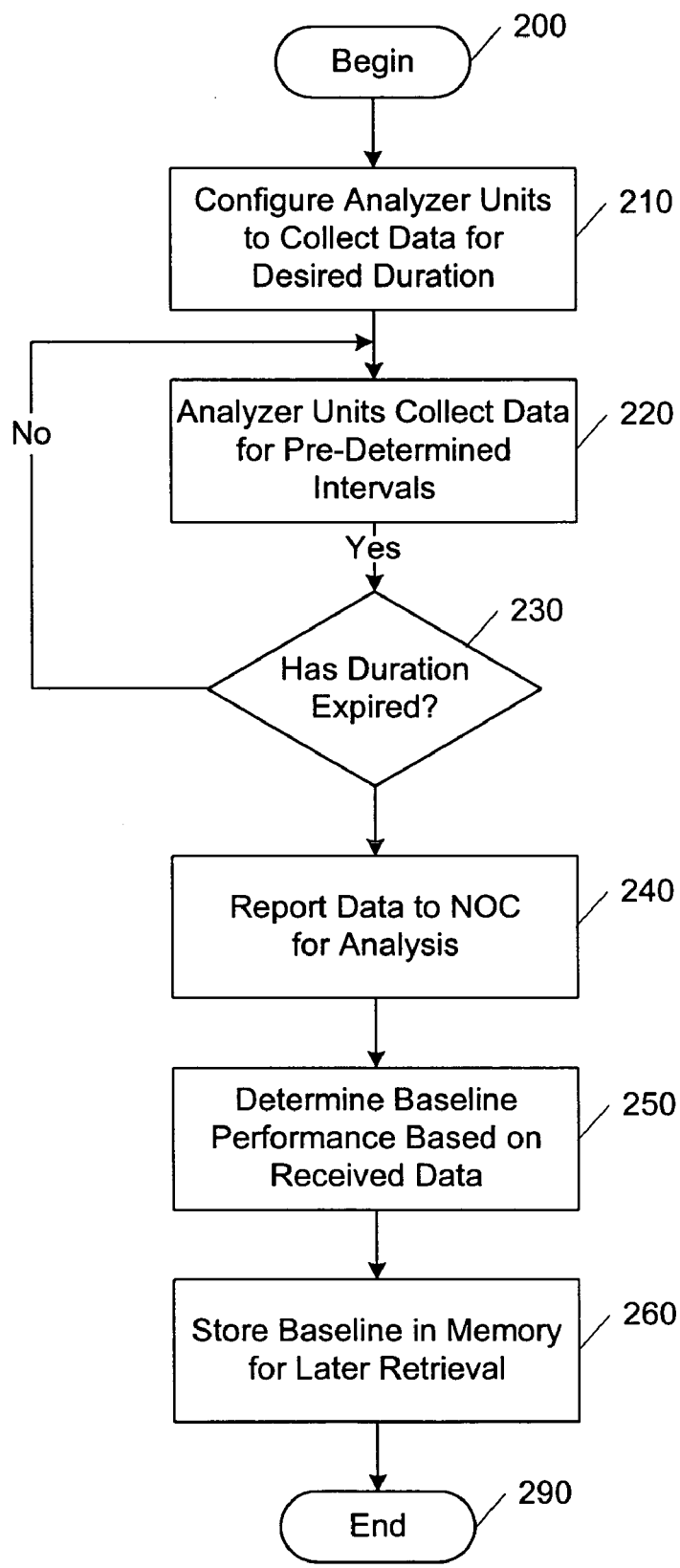
FIG. 2 is a flowchart describing the process of establishing a baseline for the operation of the communications network.

FIG. 2 is a flowchart describing the process of establishing a baseline for the operation of the communications network 100. The following describes the process of establishing a baseline for the analyzer unit 140, but the process is performed at each location of all of the analyzer units. More particularly, network performance at the location of each analyzer unit may have a baseline that is unique to its location in the network 100. Typically, the process begins at block 200 when a new analyzer unit is installed in a location in the network 100. Once an analyzer unit is installed at a particular location, the network administrator may desire to obtain an operational profile for that location over a predetermined duration. Hence at block 210, the network administrator configures, for example, the analyzer unit 140 to collect diagnostic data from its location over a period of time, e.g., for two, three, or four weeks.

The duration of collecting data may be up to any period of time, however, it is desirable to have such duration be set for at least one week. During this duration, it is desirable to configure the analyzer unit 140 to collect data during periodic time intervals, e.g. every 10, 20, 40, 60 minutes, or any other desired interval. Accordingly, at block 220, the analyzer unit 140 collects data (e.g., every 60 minutes) and stores the data for later retrieval by the NOC 130. The analyzer unit 140 may be configured to store the data as a function of time to allow identification of the time at which data was collected. The location (e.g., a geographical location) of the analyzer unit 140 is usually known to the NOC 130 and, hence, it may not be necessary to record such information in association with the collected data. At block 230, the analyzer unit 140 determines if the duration has expired to decide whether to continue or cease the collection of data. If the duration of collection has not expired, the process returns to block 220 where the analyzer unit 140 continues to collect data during periodic time intervals. If, on the other hand, the duration of collection has expired, the process continues to block 240.

At block 240, the analyzer unit 140 reports the collected data to the NOC 130, or other designated destination, for analysis. In some situations, it may be desirable to have the NOC 130 continuously receive the data as collected in real-time or near real-time. In other situations, it may be desirable to configure the analyzer unit 140 to perform analysis on the data locally and, then, report the outcome (e.g., data representing a baseline graph) to the NOC 130 for storage. Finally, at any time, the NOC 130 may retrieve data from the analyzer unit 140 upon demand. The collected data typically represents diagnostic information collected from circuits in the network 100. For further details on the type of diagnostic information, reference is made to the '923 application. In one embodiment, it is desirable to record, at least in part, data representing packet loss and latency between the analyzer unit 140 and one or more other analyzer units that are distributed in the network 100. As noted above, collecting packet loss and latency information is achieved by the ability of the analyzer units to establish independent links among each other within the network 100.

At block 250, the NOC 130 receives the data from the analyzer unit 140 and conducts an analysis to establish a baseline for packet loss and latency. In analyzing such data, the NOC 130 may estimate the average (e.g., statistical mean or median) of the packet loss for each time interval and day. For example, the average packet loss may be estimated as 0.006 percent for 9 A.M., 0.006 for noon, and 0.008 for 3 P.M. by averaging the multiple packet loss measurements for the same day of the week, e.g., for two, three or four Wednesdays. The packet loss may or may not be different on other days. Accordingly, the NOC 130 ultimately forms a baseline for the 24 hour period and seven days of the week. At block 260, the NOC 130 stores the baseline in association with the location of the analyzer unit 140 in the network 100. The NOC 130 may repeat this entire process for other analyzer units, as required. The utilization of this stored baseline is further described below. The process terminates at block 290.

Figure 3:
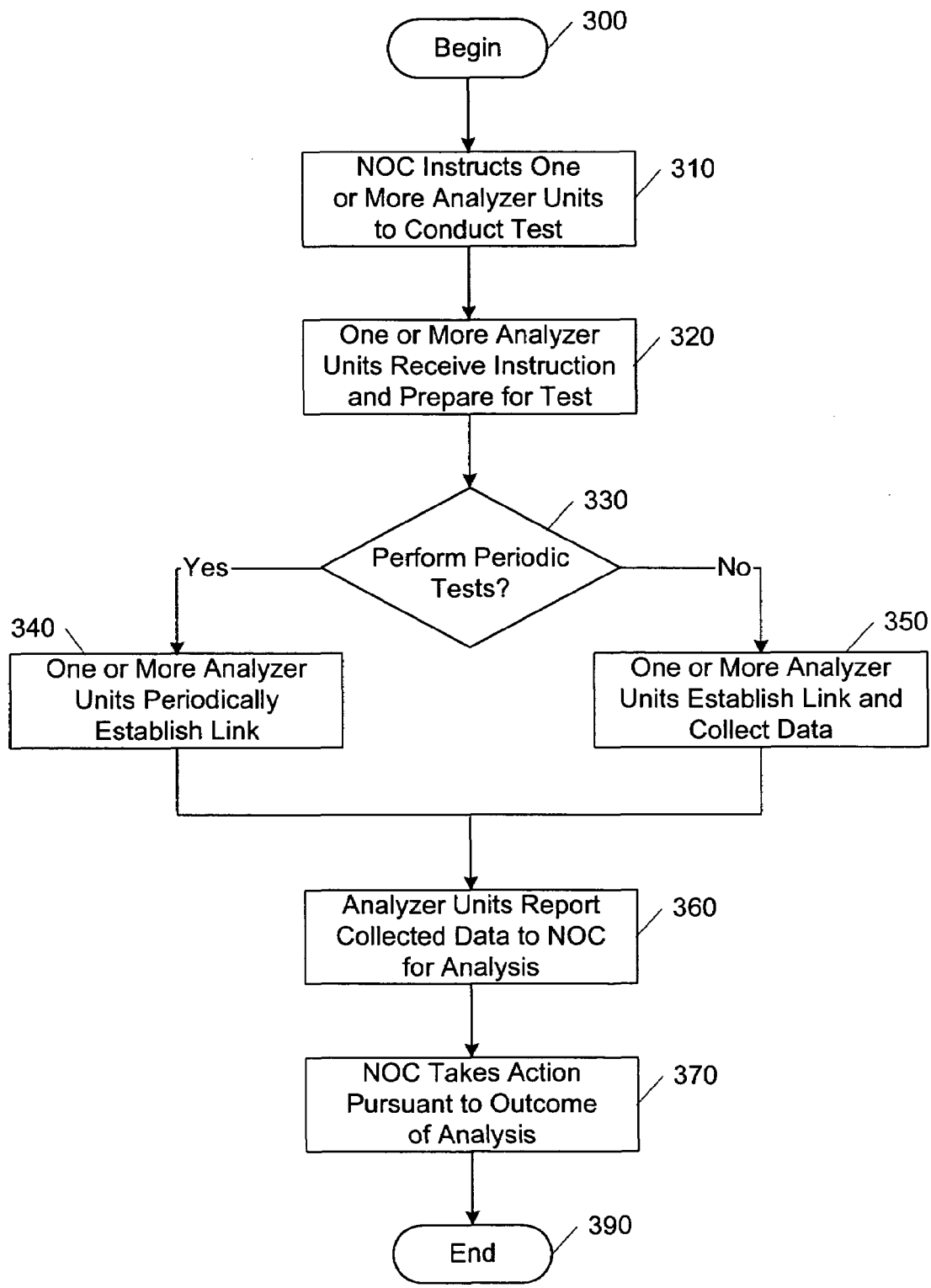
FIG. 3 is a flowchart describing the operation of one embodiment of the analyzer unit in the communications network.

FIG. 3 is a flowchart describing the operation of one embodiment of the analyzer units 110, 120, and 140 in the communications network 100. The network administrator may remotely control the operation of the analyzer units to perform tests on virtually every link in the network 100. The ability of the network administrator to test all links may be limited by the number of analyzer units distributed across the network 100. The process begins at block 300 where a customer (e.g., the customer equipment 160) may report a degradation or problem in the service provided by the network 100. At block 310, the network operator 310 may respond to the customer report by commanding the NOC 130 to instruct the analyzer unit 120 to collect diagnostic data and perform network performance analysis. In its instructions, the NOC 130 may specify the identity of the one or more analyzer units with which the analyzer unit 120 is to establish a test link. For example, the NOC 130 may specify the analyzer unit 140 with which the analyzer unit 120 is to establish a link and collect packet loss and latency information.

At block 320, the analyzer unit 120 receives the instructions from the NOC 130 and prepares to perform the data collection. At block 330, the analyzer unit 120 determines whether the NOC 130 specifies a one-time test, or periodic test over a specified duration. If the NOC 130 specifies a one-time test, the process continues to block 350 where the analyzer unit 120 performs a handshake with the analyzer unit 140 and establishes a link for testing the network 100. The analyzer unit 140 exchanges predetermined streams of data with the analyzer unit 140 to test physical and protocol layers of the link. As noted above, the analyzer unit 120 measures the packet loss and latency of the link established with the analyzer unit 140. It is desirable to timestamp such data collection for later analysis by the NOC 130. If, on the other hand, the NOC 130 specifies a periodic test over a duration (e.g., 24 hours or one-week period), the process continues to block 340 where the analyzer unit 120 repeats the one-time test during periodic time intervals for the entire duration. From blocks 340 and 350, the process continues to block 360.

At block 360, the analyzer unit 120 is configured to report the collected data to the NOC 130 for analysis. In analyzing the data (e.g., packet loss and latency), the NOC 130 compares the collected data to the baseline of network performance for the location of the analyzer unit 120. Using the timestamp information, it is desirable to compare the collected data to the baseline information (already stored) that corresponds to the same time. For example, at time 12:00 P.M. on a Wednesday, the collected packet loss may be 0.050. As noted above, the stored baseline for the same day and time of the location of the analyzer unit 140 may, for example, specify a packet loss of 0.006. Hence, in this example, the collected packet loss exceeds the baseline packet loss for the same time, day, and location in the network 100. As noted above, the network administrator may define an "alert threshold" by selectively setting a percentage of packet loss beyond which the NOC 130 issues an alert to maintenance personnel. If, for example, the alert threshold is set for a packet loss that is 20% above the baseline packet loss, then a packet loss of 0.050 exceeds the baseline packet loss of 0.006 by more than the threshold of 20%. Accordingly, at block 370, the NOC 130 may issue an alert to responsible personnel indicating that an unacceptable packet loss is reported at the location of the analyzer unit 120. The issuance of an alert may be performed by any desired method of communication, e.g., pager, e-mail, telephone, facsimile, and/or others. In response to such an alert, maintenance personnel may attend to the problem if necessary.

Figure 4:
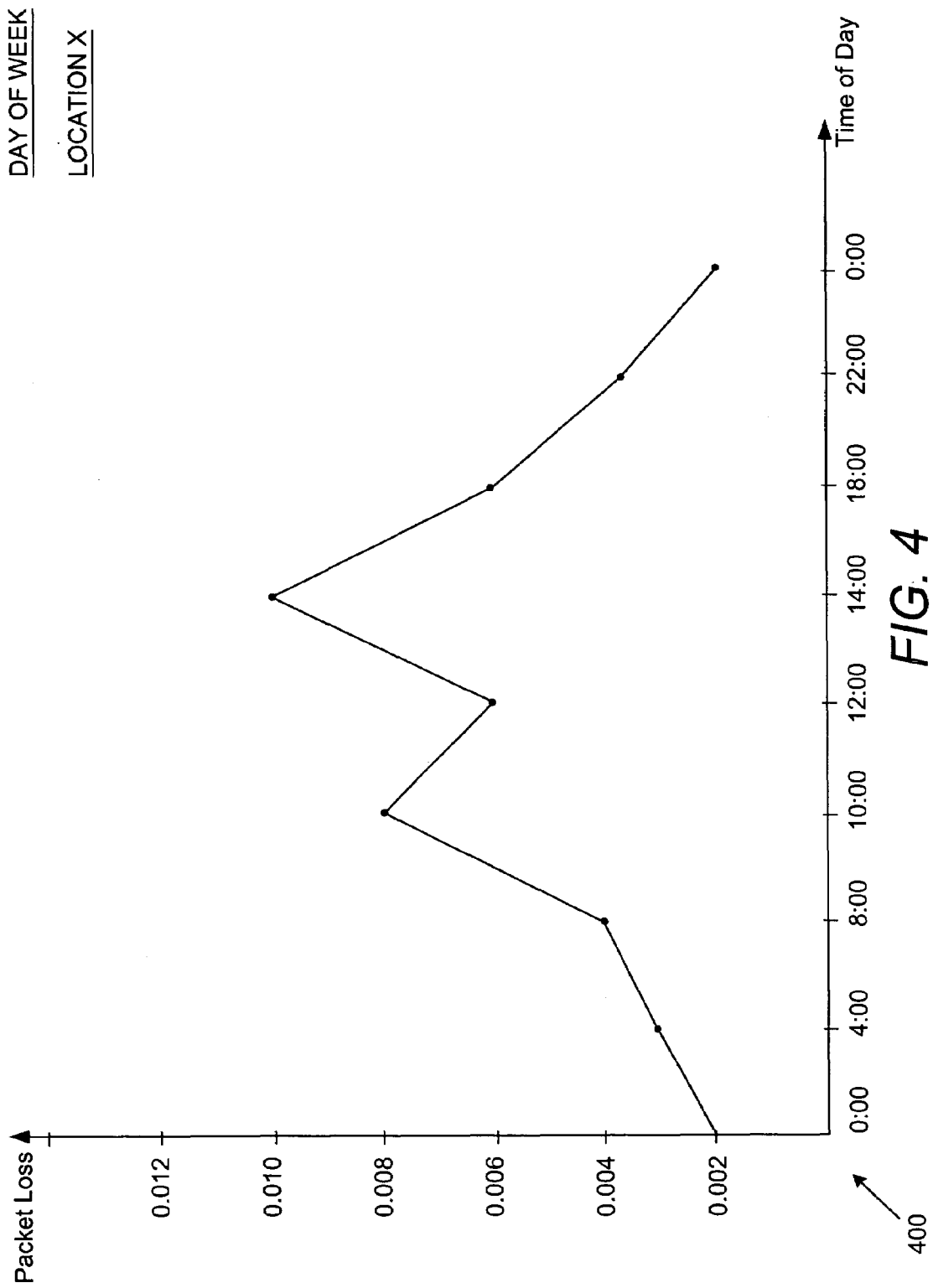
FIG. 4 is a graph representing the baseline for the communications network as a function of time of day.

FIG. 4 shows a graph 400 representing the baseline for the communications network 100 as a function of the time of day. The graph 400 includes a horizontal axis (x-direction) which represents a time of day, i.e., 24-hour period. Additionally, the graph 400 includes a vertical axis (y-direction) representing a communication parameter, e.g., packet loss. The vertical axis may represent any other communication parameter, such as packet latency, and the packet loss is used merely as an illustrative parameter. As noted in the description of the process of FIG. 2, upon installation of an analyzer unit in a location of the network 100, the profile of the baseline of network performance is reported to and recorded in the NOC 130. The baseline may or may not be the same for different days or locations across the network 100. Hence, the graph 400 represents a baseline profile for location X and for a particular 24-hour period, e.g., Monday. For each location, the NOC 130 typically may store data representing up to seven graphs for the seven days of the week. As described above, the NOC 130 utilizes the baseline information to monitor the performance of the network 100 at the locations of the analyzer units.

In one embodiment, each analyzer unit may be configured to conduct intrusive and non-intrusive testing of an established link in the network 100. More particularly, the NOC 130 may command two or more analyzer units to communicate data over an established link and perform a non-intrusive traffic injection in that link. For example, the analyzer unit 110 may inject traffic of predetermined data streams destined to the analyzer unit 120. Also, the analyzer unit 120 may inject traffic of predetermined data streams destined to the analyzer unit 110. Bidirectional traffic injection allows the network administrator to measure communication parameters, such as packet loss and latency, for both directions of the link.

Figure 5:
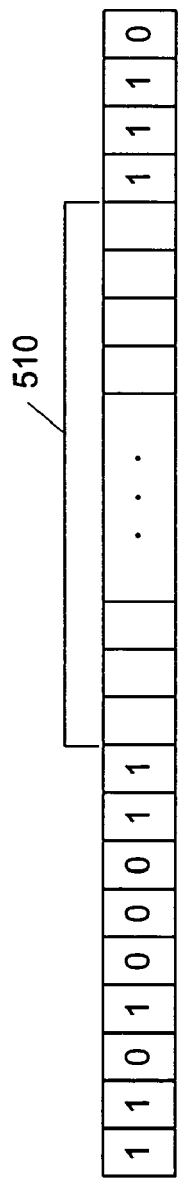
FIG. 5 is a pictorial representation of typical data streams communicated to and from customer equipment of the communications network.

FIG. 5 is a pictorial representation of typical data streams communicated to and from customer equipment, such as the customer equipment 150 of the network 100. The data may be communicated in bursts, i.e., sets of data bits at intermittent time intervals. Hence, a communication link between the customer equipment 150 and a destination (e.g., the customer equipment 160) often includes silent transmission periods where no data is communicated. As shown in FIG. 5, data bits are represented by binary values 1's and 0's, whereas the absence of data is represented by blank bits. Accordingly, the data bits 510 represent a silent period during which no data is communicated to and from the customer equipment 150. To permit non-intrusive traffic injection, the analyzer unit 110 is configured to detect the beginning and termination of the silent period 510.

Figure 6:
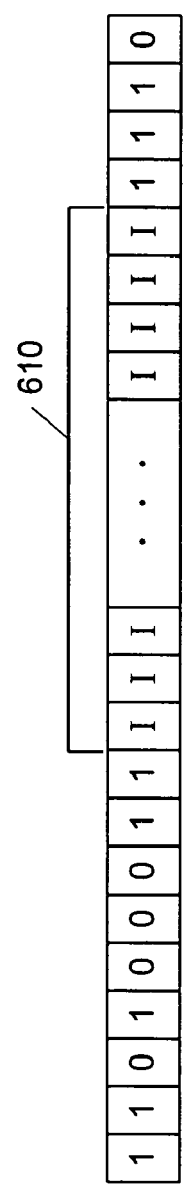
FIG. 6 is a pictorial representation of the process of non-intrusively injecting traffic in a communications network link.

FIG. 6 is a pictorial representation of the process of non-intrusively injecting traffic in a communications network link. During traffic injection testing, it is desirable to inject data streams during one or more silent periods. Accordingly, the period of traffic injection is represented by the data bits 610, where each bit is marked as "I" to indicate an injected bit. Injection of data streams during silent periods avoids disrupting normal data flow to and from the customer equipment 150. Once resumption of data transmission is detected, the analyzer unit 110 is configured to "back off" and refrain from injecting traffic data over the link. Hence, the network administrator may test a link by traffic injection without affecting on-going communication among the various sources and destinations in the network 100. As discussed above, traffic injection may be performed remotely from the NOC 130. In that case, the participating analyzer units (e.g., analyzer units 110 and 120) report the test results to the NOC 130 for analysis and action by the network administrator.

In view of the foregoing, it will be appreciated that the invention overcomes the long-standing need for a system and method of analyzing a communications network by testing one or more links between two or more locations across the network. The entire testing of a network may be performed from a single remote site. The invention reduces the necessity of dispatching technicians and expensive equipment to network boundaries to determine the source of a network malfunction. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes which fall within the meaning and range of equivalency of the claims are to be embraced within their scope.

What is claimed is:

1. A system for testing at least one link in a communications network, the system comprising:
   a first analyzer unit in data communication with the network;
   a second analyzer unit in data communication with the first analyzer; and
   a computer in data communication with the first and second analyzers, the computer being configured to command the first analyzer unit to establish a network link with the second analyzer unit, collect diagnostic data from the network link, and communicate the data from the first analyzer unit to the computer, wherein the computer is configured to determine whether a parameter associated with the diagnostic data deviates from a network baseline by a predetermined threshold, the network baseline being dependent at least in part upon data collected previously from the network.

2. The system as defined in claim 1, wherein the first and second analyzer units are connected to the network at the location of the network boundary.

3. The system as defined in claim 1, wherein the network includes at least one of ATM, frame relay, Internet, ISDN, and SONET circuits.

4. The system as defined in claim 1, wherein the computer is configured to communicate with the first and second analyzer units via a facilities data link (FDL).

5. The system as defined in claim 1, wherein the first analyzer unit is configured to measure at least one communication parameter in the network link.

6. The system as defined in claim 5, wherein the communication parameter includes at least one of a packet loss and packet latency of the network link.

7. The system as defined in claim 1, wherein at least one of the first and second analyzer units is configured to non-intrusively inject data in the network.

8. The system as defined in claim 1, wherein the first analyzer unit is configured to collect baseline diagnostic data over a predetermined duration to represent a network baseline.

9. The system as defined in claim 8, wherein the computer issues an alert in the event that the diagnostic data deviate from the baseline by a predetermined threshold.

10. A method of testing at least one link in a communications network, the method comprising:
    establishing a link between a first analyzer unit and a second analyzer unit that are connected to the network;
    measuring at least one communication parameter of the link;
    determining whether the communication parameter deviates from a network baseline by a predetermined threshold; and
    issuing an alert in the event that the communication parameter deviates from the network baseline by the predetermined threshold, the newtork baseline being dependent at least in part upon data collected previously from the newtork.

11. The method as defined in claim 10, further comprising transmitting the communication parameter to a computer.

12. The method as defined in claim 10, further comprising remotely commanding the first and second analyzer units via commands via the network.

13. The method as defined in claim 10, further comprising remotely commanding the first and second analyzer units via commands communicated over a facilities data link (FDL).

14. The method as defined in claim 10, further comprising collecting diagnostic data from the network for a predetermined duration, the diagnostic data representing a network baseline.

15. The method as defined in claim 14, further comprising estimating a statistical average of the at least one communication parameter for the same time, day, and location.

16. The method as defined in claim 10, further comprising non-intrusively injecting data by the first analyzer unit into the network.

17. The method as defined in claim 16, further comprising receiving the non-intrusively injected data by the second analyzer unit from the network.

18. The method as defined in claim 10, wherein measuring at least one communication parameter includes measuring at least one of a packet loss and packet latency of the link.

19. A system for testing at least one link in a communications network, the system comprising:
    first means for analyzing the link, the first analyzing means in being data communication with the network;
    second means for analyzing the link, the second analyzing means being in data communication with the first analyzing means; and
    means for controlling the first and second analyzing means, the controlling means being configured to command the first analyzing means to establish a network link with the second analyzing means, collect diagnostic data from the network link, and communicate the data from the first analyzing means to the controlling means, and wherein the controlling means is configured to determine whether a parameter associated with the diagnostic data deviates from a network baseline by a predetermined threshold, the network baseline being dependent at least in part upon data collected previously from the newtork.

20. The system as defined in claim 19, wherein the network includes at least on of an ATM, frame relay, Internet, ISDN, and SONET circuits.

21. The system as defined in claim 19, wherein the controlling means communicates data with the first and second analyzing means via a facilities data link (FDL).

22. The system as defined in claim 19, wherein the first analyzing means measures a packet loss and latency of the network link.

23. The system as defined in claim 19, wherein at least one of the first and second analyzing means non-intrusively injects data in the network.

24. The system as defined in claim 1, wherein the computer is further configured to estimate the average packet loss or latency during a predetermined period of time to establish the network baseline.

* * * * *

UNITED STATES PATENT AND TRADEMARK OFFICE
CERTIFICATE OF CORRECTION

| | | |
|---|---|---|
| PATENT NO. | : 7,072,305 B1 | Page 1 of 1 |
| APPLICATION NO. | : 09/430687 | |
| DATED | : July 4, 2006 | |
| INVENTOR(S) | : Gregson | |

It is certified that error appears in the above-identified patent and that said Letters Patent is hereby corrected as shown below:

Col. 9, line 57, "newtork...." should read -- network --

Col. 9, line 59, "newtork...." should read -- network --

Signed and Sealed this

Twenty-second Day of May, 2007

JON W. DUDAS
*Director of the United States Patent and Trademark Office*